UNITED STATES PATENT OFFICE.

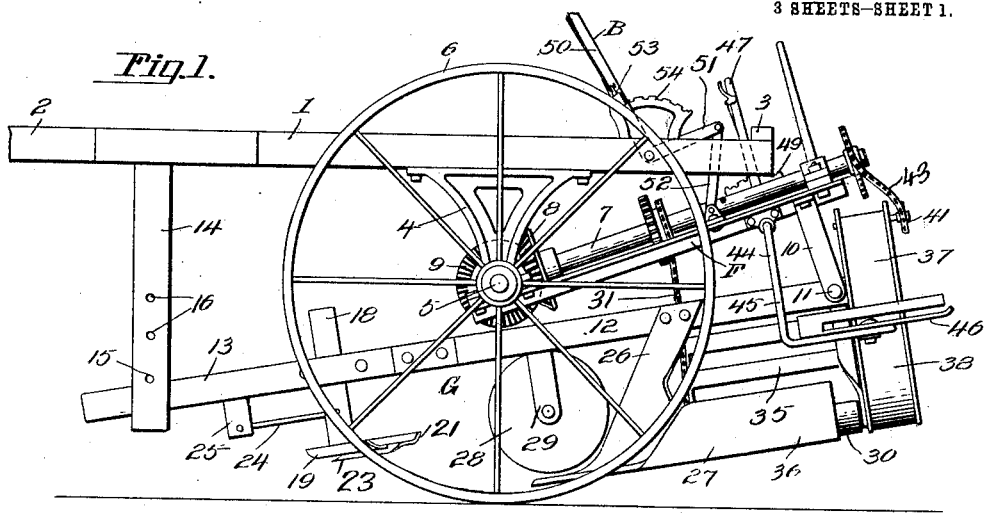
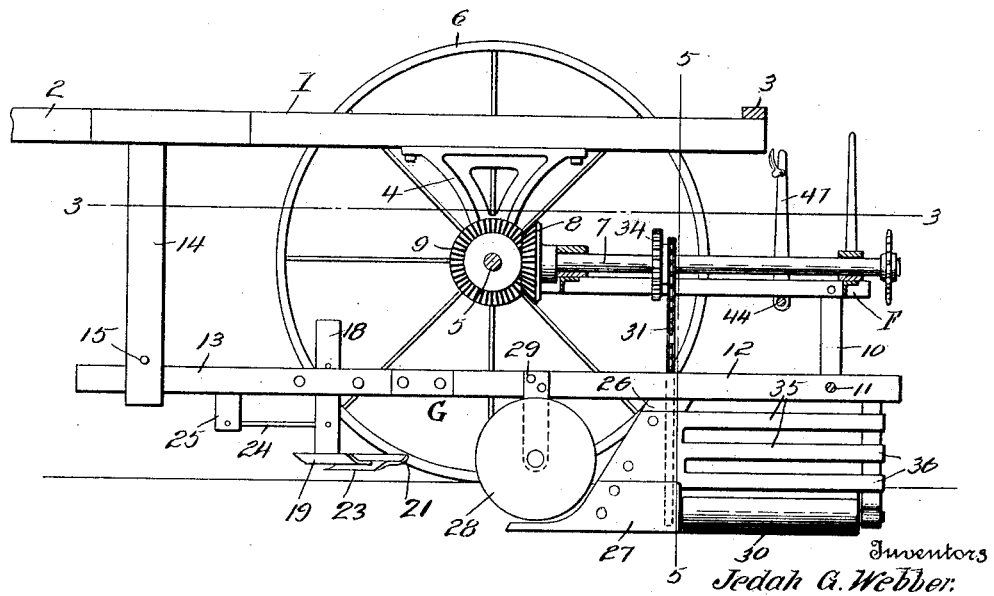

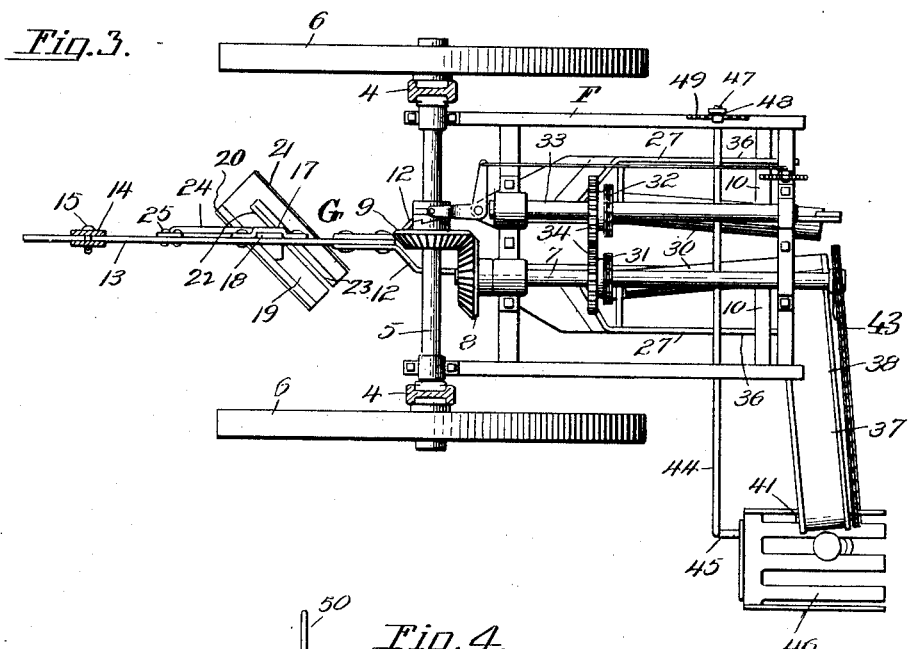
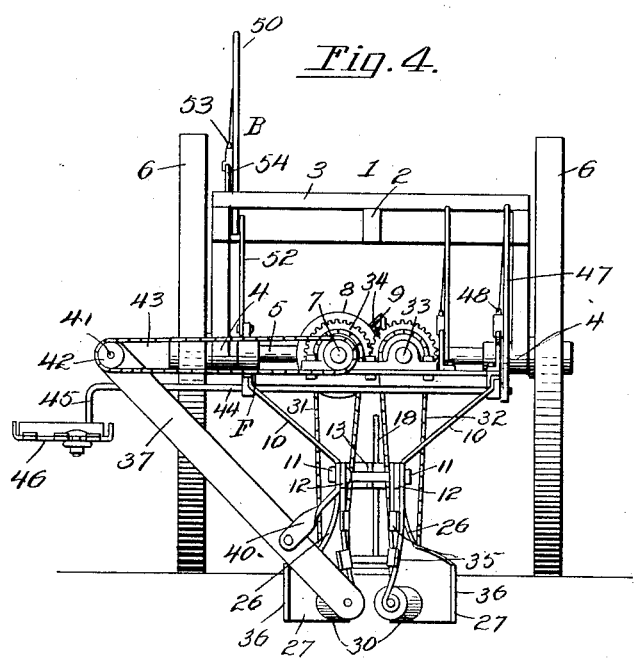

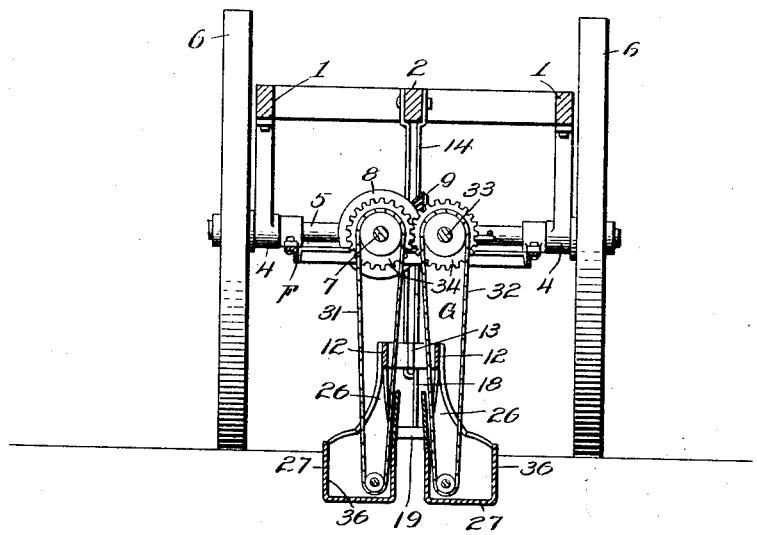

JEDAH G. WEBBER AND CHARLES F. CARR, OF ANTWERP, OHIO.

BEET-HARVESTER.

1,112,344. Specification of Letters Patent. Patented Sept. 29, 1914.

Application filed February 14, 1913. Serial No. 748,408.

*To all whom it may concern:*

Be it known that we, JEDAH G. WEBBER and CHARLES F. CARR, citizens of the United States, residing at Antwerp, in the county of Paulding and State of Ohio, have invented new and useful Improvements in Beet-Harvesters, of which the following is a specification.

This invention relates to beet harvesters, and it has for its object to produce a simple and efficient organized machine for topping beets, for lifting the beets from the ground, for elevating the beets and depositing them in a receptacle and for discharging them in piles on the ground for subsequent gathering.

A further object of the invention is to simplify and improve the various details of the machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a beet harvester constructed in accordance with the invention. Fig. 2 is a longitudinal sectional view. Fig. 3 is a horizontal sectional view taken on the line 3—3 in Fig. 1. Fig. 4 is a rear elevation. Fig. 5 is a transverse sectional detail view taken on the line 5—5 in Fig. 1. Fig. 6 is a sectional detail view of the topper. Fig. 7 is a detail plan view of the lifting plows and the rollers associated therewith.

Corresponding parts in the several figures are denoted by like characters of reference.

The main frame of the improved machine includes side members 1 that converge forwardly and are connected at their front ends with a center bar 2 which extends forwardly and constitutes a tongue. A rear cross bar 3 connects the center bar with the side members, as shown. The side bars of the frame are provided with boxes or bearing members 4 for the axle 5 on which the ground wheels 6 are mounted for rotation therewith, it being understood that any well known form of a clutch may be used to permit the ground wheels to rotate independently of the axle.

Pivotally supported on the axle 5 is a rearwardly extending frame F on which a shaft 7 is supported for rotation, said shaft being connected with the axle so as to derive motion therefrom by intermeshing bevel gears 8, 9. The frame F is provided with downwardly extending brackets 10 that are pivotally connected by pins or bolts 11 with the side members 12 of a sub-frame G, said side members 12 converging forwardly, as shown, and the said side members being connected with a forwardly extending arm 13 that is pivotally connected with a bracket 14 extending downwardly from the center bar 2 of the main frame. The pin or bolt 15 which connects the arm 13 with the bracket 14 is adjustable in any one of a plurality of perforations 16 in the bracket 14, thus permitting the arm 13 which constitutes the front end of the sub-frame G to be vertically adjusted with respect to the main frame.

The arm 13 is provided with a keeper 17 wherein is guided a shank 18 carrying at its lower end the topper 19, said topper consisting of a rectangular plate disposed obliquely with respect to the frame of the machine and having uwardly curved front and rear edges 20 and 21. Said plate is also provided with a recess 22 disposed in parallel relation to the oblique front and rear edges of the plate, the outer or rearmost end of said recess opening through the side edge of the topper plate. The rear edge wall of the recess 22 is bent downwardly and is beveled or sharpened to form a cutting edge 23, it being understood that the topper plate is made of steel properly tempered to enable it to hold a cutting edge. The shank 18 carrying the topper plate is freely movable in the keeper 17, and the topper plate will drop by gravity to a ground engaging position. When in such position the upturned front edge will enable it to ride over the beets, the tops of which will be crushed down by the weight of the plate and shank. The cutting edge 23 will sever the tops, which latter as the machine advances will slide laterally and rearwardly until they escape through the open end of the slot or recess, said discharging movement being facilitated by the upturned rear edge 21 of the topper plate, whereby the severed tops will be pushed and gradually discharged, as described. It is obvious that the topper operating by gravity will automatically adjust itself to the sizes of the beets that are operated upon, and that it will ride over such beets as protrude more or less from the ground so as to remove the tops evenly and accurately from the beets without wasting the valuable material of the latter.

For the purpose of limiting the downward movement of the topper when the carrying frame is elevated, as will be hereinafter described, the shank 18 is connected by a link 24 with a lug 25 that extends downwardly from the arm 13. This link, which also serves to reinforce the construction so as to avoid undue strain on the keeper 17 and the shank 18, is sufficiently loose to permit the topper to operate in the manner described.

The side members 12 of the sub-frame G are provided with standards 26 carrying right and left plows 27 which are sufficiently spaced apart to operate adjacent to the row of beets. Rotary colters 28 carried by shanks 29 are also provided in advance of the plows. The colters will serve to cut incisions in the soil adjacent to the beets, and the plows will move the dirt away from the sides of the row of beets, as will be readily understood, the beets passing between the plows in a rearward direction.

Bearings are provided in rear of the plows for a pair of rearwardly converging rollers 30, said bearings being associated with the sub-frame G. One of the rollers 30 is driven by a chain 31 direct from the shaft 7, and the other roller is driven by a chain 32 from a counter shaft 33 which receives motion from the main shaft 7 through the medium of intermeshing gears 34 so as to be driven reversely to the said shaft 7. One of the rollers will thus be driven clockwise and the other roller counter-clockwise in such fashion as to exercise a lifting action on the beets engaged thereby, the beets being by the action of said rollers gradually extracted from the ground, as will be readily understood. The sub-frame G is equipped with guard strips or members 35 constituting a cage to prevent the beet from being lost sidewise over the rollers. Guard members 36 are also connected with the plows extending rearwardly therefrom adjacent to the rollers and exteriorly of the latter to prevent said rollers from being clogged with dirt.

Pivotally associated with one of the rollers 30 is the lower end of an elevator trunk or casing 37 supporting an endless carrier 38 which is guided over a pulley 39 which is supported for rotation about the axis of the roller. The elevator casing 37 is also connected with a bracket 40 associated with the sub-frame G. The roller carrying shaft 41 over which the carrier 38 is guided at the upper end of the casing 37 is provided with a pulley 42 which is driven from the shaft 7 by means of a chain or band 43.

A rock shaft 44 which is supported for oscillation on the frame F transversely of the latter has an arm 45 carrying a receptacle 46 into which the beets discharged by the elevating carrier 38 are deposited; the rock shaft 44 has a lever 47, whereby it may be conveniently manipulated for the purpose of dumping the contents of the receptacle 46. The lever 47 may be provided with a stop member 48 engaging a suitably arranged rack segment 49 for the purpose of supporting the rock shaft and related parts including the receptacle 46 in adjusted position.

Pivoted on one of the side members of the main frame is a bell crank B having an upwardly extending arm 50 constituting a handle; the other arm 51 of the bell crank is connected by a link 52 with the frame F, thereby enabling the rear end of said frame to be vertically adjusted by rocking said frame with respect to the axle on which it is pivotally mounted. The arm 50 of the bell crank may be provided with a stop member 53 engaging a suitably arranged segment rack 54 for the purpose of maintaining the parts in position at various adjustments.

It will be seen that by manipulating the bell crank B, the frame F, together with the sub-frame G, may be adjusted vertically so as to move the various operative parts of the device into or out of engaging position with respect to the ground. It will be noted that while such adjustment involves an independent movement of the sub-frame G with respect to the frame F, the brackets 10 of the frame F with which the side members of the sub-frame are pivotally connected are placed or located in such close proximity to the transmission chains 31 and 32 that said chains will not be subjected to undue tension when the sub-frame is lowered to an operative position, nor will said chains be liable to be displaced from the cogs of the sprockets engaged thereby when the frame is raised or elevated. When the machine is drawn over the ground, the tops of the beets will be removed by the topper, the colters and the plows will remove the dirt from the sides of the beets, and the beets will be engaged by the lifting rollers, being discharged from said rollers on to the elevating carrier whereby they are deposited upon the receptacle 46 to be subsequently dumped on the ground in piles convenient for gathering.

The entire construction of the machine is simple and inexpensive, and the machine will be found to be thoroughly efficient for the purposes for which it is provided.

Having thus described the invention, what is claimed as new, is:—

1. In a beet harvester, a wheel supported frame structure including a movably and adjustably supported sub-frame, colters and plows carried by the sub-frame, said plows being spaced apart laterally, rearwardly converging driven rollers supported in rear of the plows, and guard members constituting a cage between said rollers.

2. In a beet harvester, a frame structure, right and left hand plows carried thereby, rearwardly converging driven rollers in rear of the plows, guard members extending rearwardly from the plows outside the rollers, and guard members constituting a cage between and above the rollers.

3. In a beet harvester, the combination with means for displacing the dirt from adjacent to the sides of the beets, or rearwardly converging lifting rollers, means for driving the same, and guard members constituting a cage between and above the lifting rollers.

4. In a beet harvester, means for displacing the dirt adjacent to the sides of the beets, rearwardly converging lifting rollers in rear of the dirt displacing means, means for driving the rollers, and elevating means including a conveyer casing supported pivotally with respect to one of the rollers.

5. In a beet harvester, means for displacing the dirt from adjacent to the sides of the beets, rearwardly converging driven lifting rollers in rear of the dirt displacing means, guard members constituting a cage between and above the lifting rollers, and beet elevating means including a casing which is supported pivotally with respect to the axis of one of the rollers.

In testimony whereof we affix our signatures in presence of witnesses.

JEDAH G. WEBBER.
CHARLES F. CARR.

Witnesses:
MERVIN DAY,
A. A. SUNDAY,
ALFRED CARR.

Copies of this patent may be obtained for five cents each, by addressing the "Commissioner of Patents, Washington, D. C."